United States Patent [19]

Billiu

[11] Patent Number: 5,338,588
[45] Date of Patent: Aug. 16, 1994

[54] METHOD OF MAKING REINFORCED STRUCTURAL COMPOSITE ASSEMBLIES AND ASSEMBLY PRODUCED THEREBY

[75] Inventor: Charles R. Billiu, Mount Clemens, Mich.

[73] Assignee: Ticom Corporation, Warren, Mich.

[21] Appl. No.: 974,418

[22] Filed: Nov. 12, 1992

Related U.S. Application Data

[63] Continuation-in-part of Ser. No. 732,618, Jul. 19, 1991, Pat. No. 5,173,142.

[51] Int. Cl.$^5$ .................. B29D 22/00; B29D 23/00
[52] U.S. Cl. .................. 428/36.3; 428/35.7; 156/245; 156/272.2; 156/273.3; 156/275.5; 156/292; 156/275.7; 156/304.2
[58] Field of Search .................. 428/35.7, 36.3; 156/245, 27.2, 273.3, 275.5, 275.7, 304.2

[56] References Cited

U.S. PATENT DOCUMENTS

| | | | |
|---|---|---|---|
| 2,668,133 | 2/1954 | Brophy et al. | 154/126 |
| 2,997,419 | 8/1961 | Lawton | 154/126 |
| 3,881,521 | 5/1975 | Johansen et al. | 138/126 |
| 4,374,229 | 2/1983 | Dunnavant et al. | 525/28 |
| 5,037,696 | 8/1991 | Miyake et al. | 428/336 |
| 5,173,142 | 12/1992 | Billiu | 156/245 |

FOREIGN PATENT DOCUMENTS

9104840 4/1991 PCT Int'l Appl. .

OTHER PUBLICATIONS

W. Brenner and W. F. Oliver, Commercial Aspects of Instantaneous Radiation Cure of Reinforced Plastics, 22nd Annual Conference, The Society of the Plastics Industry–Reinforced Plastics Division, pp. 1–5.

Chang and Nishimura, A Peak into the Mechanism of Electron Beam Curing of Polyurethan Composite, The Association for Finishing Processes of SME, 1980, pp. 1–14.

Electron Beam Curable Polyurethane Blaneds As Magnetic Media Binders, Journal of Radiation Curing, Jan., 1985, Jurek and Keller, pp. 20–25.

ARIMAX 1100-10 Side A and ARIMAX 1100 Side B, Ashland Chemical Co.

*Primary Examiner*—Ana L. Carrillo
*Assistant Examiner*—Mary Critharis
*Attorney, Agent, or Firm*—Flynn, Thiel, Boutell & Tanis

[57] ABSTRACT

The present invention contemplates a method of making a hollow section fiber reinforced composite assembly useful as a structural component wherein a first rigid, fiber reinforced, EB (electron beam) curable-thermoplastic composite member is formed by liquid castable molding (LCM) thermoplastic-forming material about a fiber reinforcement and a second rigid, fiber reinforced, EB curable-thermoplastic composite member is similarly formed. An EB-curable adhesive material is provided at an interface between the assembled composite members. The composite members are then partially fusion bonded (e.g. ultrasonic tack welded) together at regions of the interface devoid of adhesive to form a hollow section for subsequent curing. The hollow section is subjected to irradiation by high energy electrons effective to cure the adhesive material and the partially bonded first and second fiber reinforced, EB curable-thermoplastic members to a thermoset condition useful in structural applications.

26 Claims, 2 Drawing Sheets

METHOD OF MAKING REINFORCED STRUCTURAL COMPOSITE ASSEMBLIES AND ASSEMBLY PRODUCED THEREBY

This application is a continuation-in-part of U.S. Ser. No. 07/732 618, filed Jul. 19, 1991 U.S. Pat. No. 5,173,142.

FIELD OF THE INVENTION

The present invention relates to manufacture of a reinforced structural composite assembly including spaced apart outer and inner members joined together and, more particularly, to molding outer and inner members from a reinforcement material impregnated with a liquid castable thermoplastic material, tack welding the molded thermoplastic members together, and radiation curing the tack welded members and adhesive material therebetween to provide a thermoset composite assembly.

BACKGROUND OF THE INVENTION

In attempts at making a vehicle body from fiber reinforced structural composite assemblies, prior art workers have employed hollow sections for the same reason that separate metal stampings are welded together to create a hollow section in conventional vehicle construction; namely, to increase the stiffness of a given component since stiffness increases by the cube of the increase in section thickness.

Hollow section fiber reinforced thermoset composites have been formed by gluing two panels together or molding the entire component around a foam core, blow molded inserts, and inflatable air bags in order achieve a desired stiffness level.

Hollow section fiber reinforced, thermoset composite assemblies have been proposed for use in the manufacture of a so-called space frame automobile structure wherein a reinforced structural composite side assembly or cage and reinforced structural composite floor module are bonded together by suitable adhesive and mounted on an underlying steel frame. The automobile space frame comprises opposing hollow, molded body side assemblies bonded together by suitable adhesive. Other reinforced composite components, such as a roof module and dash module, can also be incorporated in the structure.

Each hollow body side assembly includes glass reinforced, molded vinyl ester panels separated by a space or cavity therebetween. Each body side assembly is formed by positioning multiple glass fabric reinforcement preforms in a suitable mold, introducing thermosetting vinyl ester resin into the mold to impregnate the preforms, and heat curing the resin to form the hollow glass reinforced thermoset panel assembly.

Although fiber reinforced structural composites have been formed into hollow sections suitable for use in the construction of a vehicle body, such composites and process for making them into hollow sections have not resulted in a cost competitive alternative to the stamped/welded steel panel construction heretofore employed in motor vehicle construction.

There is thus a need for an improved method of making hollow section fiber reinforced structural composite assemblies for use as structural components in motor vehicle body and other constructions at lower cost. There is also a need for an improved method of making such hollow section fiber reinforced structural composite assemblies using other materials, such as thermoplastic materials, that will facilitate composite molding and bonding to form a simple or complex structural assembly and yet treatable to impart desirable thermoset properties to the final bonded assembly.

It is an object of the present invention to satisfy these needs.

SUMMARY OF THE INVENTION

The present invention contemplates a method of making a hollow section fiber reinforced composite assembly, as well as the composite assembly, useful as a structural component wherein a first rigid, fiber reinforced, EB (electron beam) curable-thermoplastic composite member is formed by liquid castable molding (LCM) a thermoplastic-forming material about a fiber reinforcement and a second rigid, fiber reinforced, EB curable-thermoplastic composite member is similarly formed. An EB-curable adhesive material is provided at an interface formed by assembling the composite members. The first and second rigid, fiber reinforced, thermoplastic members are fusion bonded together at spaced locations (e.g. by periodic ultrasonic tack welds) to form a hollow section. Preferably, the composite members are periodically fusion bonded together at regions of the interface devoid of the adhesive material. The hollow section is subjected to irradiation by high energy electrons effective to cure the adhesive material and the tack welded first and second fiber reinforced, EB curable-thermoplastic members to a thermoset condition useful in structural applications.

In one embodiment of the invention, each fiber reinforced, EB curable-thermoplastic member is formed by introducing a liquid polyisocyanate material and a catalyzed, liquid polyol material into a mold about a fiber reinforcement (e.g., glass fiber preform) therein and reacting the materials to form an EB curable-thermoplastic matrix about the fiber reinforcement. Preferably, the polyisocyanate material comprises an aromatic polyisocyanate while the polyol material comprises an unsaturated esterol and a suitable catalyst for the polyol-isocyanate reaction. The unsaturated esterol more preferably comprises a fumarate containing carbon-to-carbon double bonds and being self-cross linking when subjected to EB irradiation in accordance with the invention.

In another embodiment of the invention, the adhesive material comprises a solvent-less oligomer, such as a solvent-less acrylate, preferably a urethane acrylate or epoxy acrylate, that is EB curable to a thermoset condition.

In still another embodiment of the invention, the first and second fiber reinforced, EB curable-thermoplastic composite members are tack welded and adhesive bonded at peripheral portions thereof forming an interface therebetween.

In still another embodiment of the invention, the hollow section is subjected to irradiation to obtain the thermoset condition by exposing the hollow section to a high energy electron beam; e.g., by passing the hollow section through an electron beam of a suitable beam generating device.

DESCRIPTION OF THE DRAWINGS

The foregoing and other objects and features of the present invention will become apparent upon consideration of the following description taken in conjunction with the accompanying drawing wherein.

DETAILED DESCRIPTION OF THE INVENTION

Figure 1:
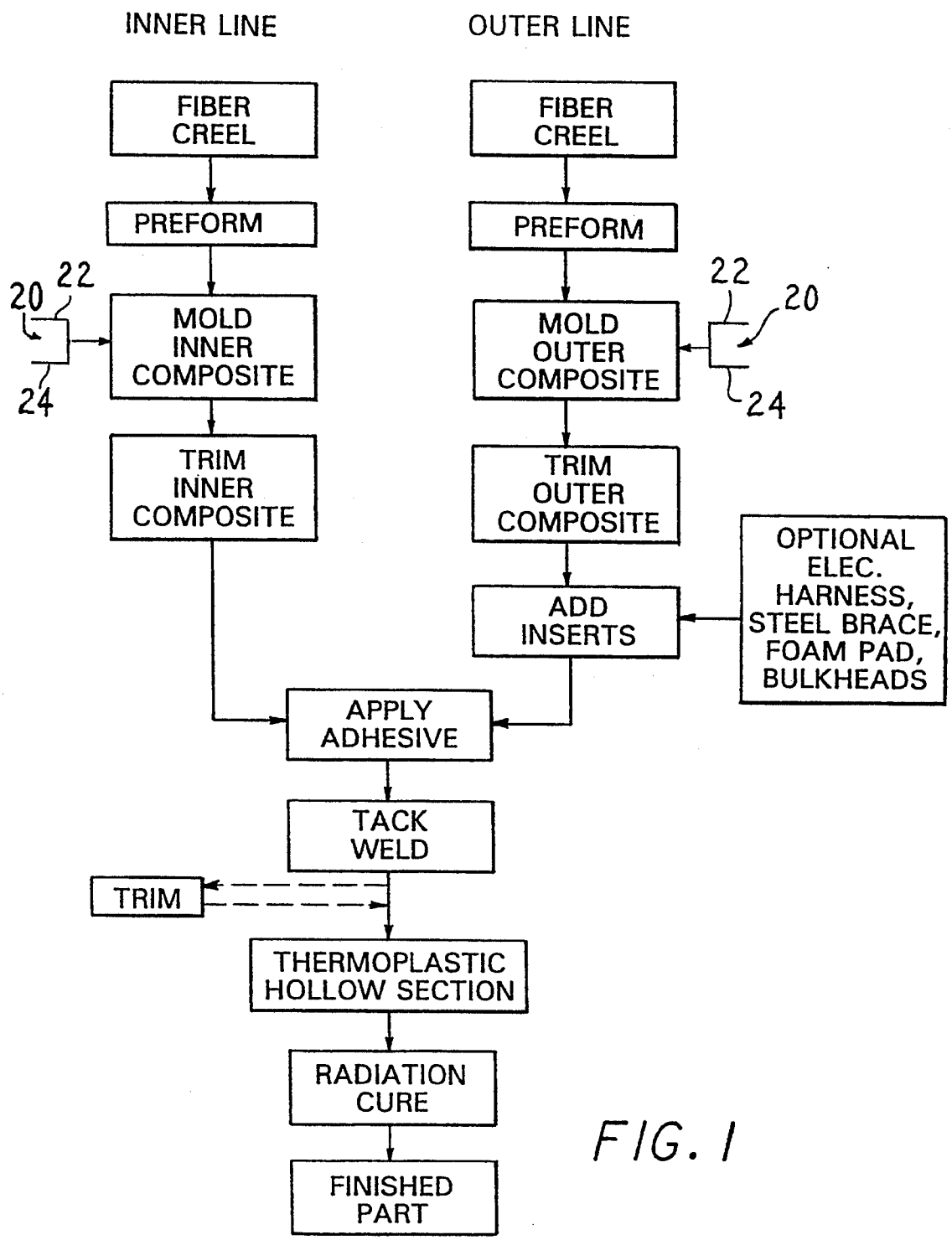
FIG. 1 is flow diagram illustrating one embodiment of the method of the present invention.
Figure 2:
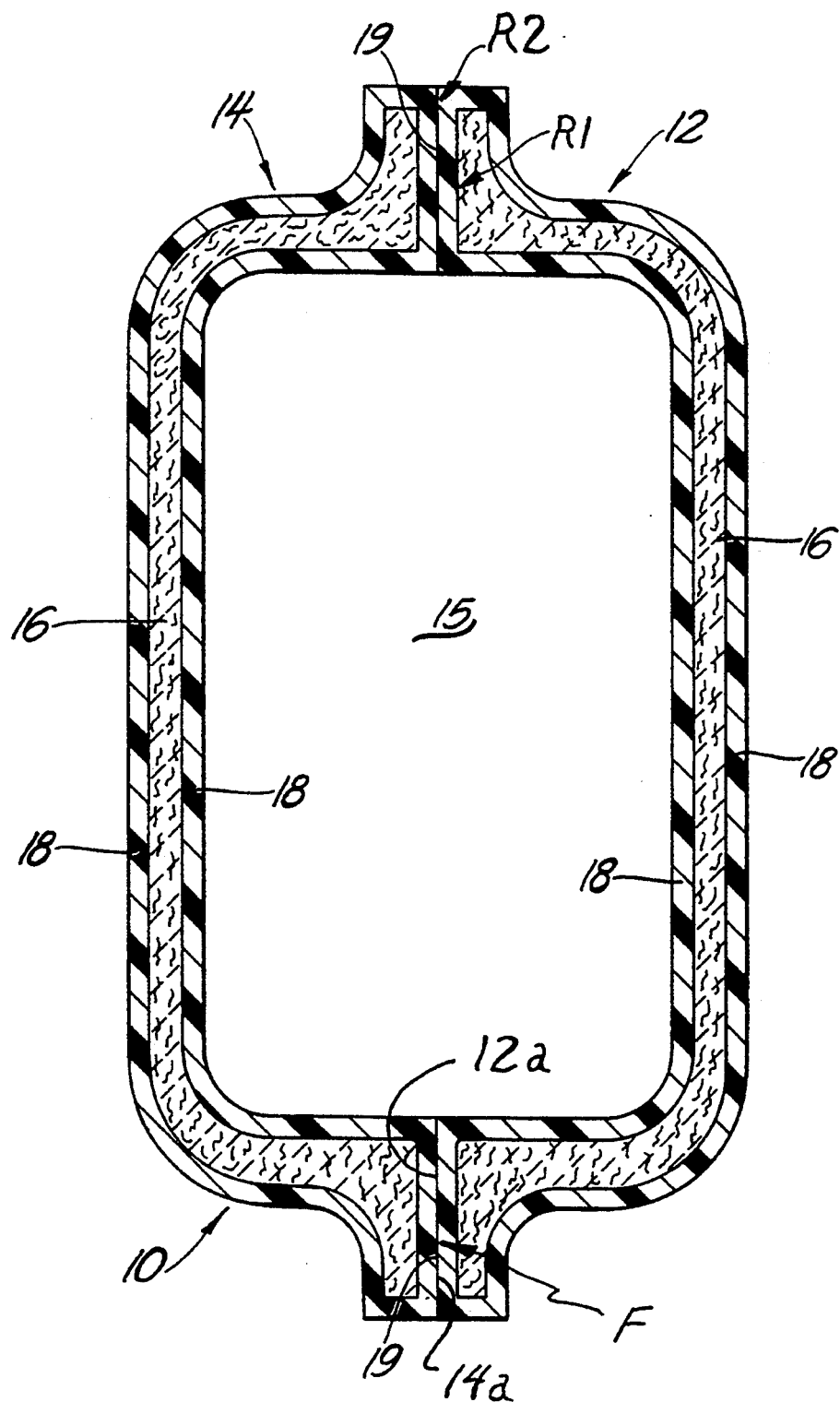
FIG. 2 is a sectional view, illustrating a hollow section fiber reinforced structural composite assembly made in accordance with the present invention.

Referring to FIG. 1, one exemplary embodiment of the invention for making a hollow section fiber reinforced composite assembly useful as a structural component in a motor vehicle is illustrated. An exemplary hollow section fiber reinforced composite assembly 10 made in accordance with the invention is shown in FIG. 2 as including first (outer) and second (inner) rigid, fiber reinforced, thermoset composite panels or members 12, 14 joined together by an adhesive bond 19 at an interface F between the members 12, 14 in a manner to be described. Each panel or member 12, 14 comprises a fiber reinforcement 16, such as a shaped glass fiber preform, and thermoset matrix 18 that is initially molded about the reinforcement as a thermoplastic and then, after partial panel bonding to form a hollow section, is EB cured to yield the thermoset condition in a fully bonded assembly 10. An internal cavity or hollow 15 is formed between the bonded members 12, 14.

In accordance with the method of the invention illustrated in FIG. 1, the first (outer) composite member 10 and the second composite member 12 are formed by like processes wherein, in each process, a conventional glass fabric or other fiber reinforcement 16 on a fiber creel is cut and pressed to form a glass fabric preform in a selected configuration or shape needed for reinforcement purposes of the respective outer and inner composite assemblies. The glass fabric preform is typically formed to desired configuration by a chop and spray technique wherein the fibers are chopped and collected on a foraminous screen; for example, as described in PCT publication WO 91/04840, the teachings of which of are incorporated by reference. However, the invention is not limited to any particular technique for fabricating the preform to a desired configuration. For example, thermo-formable glass fiber mat can be pressed to shape. Moreover, the invention is not limited to any particular reinforcement material. For example, the fiber reinforcement may comprise metal, ceramic or other fiber formed to shape by suitable techniques.

Referring to FIG. 1, the fiber reinforcement preform for the outer composite assembly 10 is positioned in a mold (not shown) having a molding cavity formed (e.g., machined) to have the selected outer composite assembly envelope or configuration. The fiber reinforcement preform for the inner composite assembly 12 is likewise positioned in another mold having a molding cavity formed to the selected inner composite assembly envelope or configuration. Each mold comprises cooperating outer and inner mold halves which are opened to receive one or more fiber reinforcement preforms and are then closed after the fiber reinforcement preform(s) is/are positioned therein in accordance with known liquid castable molding (LCM) processing.

After each mold is closed, a liquid, thermoplastic-forming material 20 is introduced into each mold about and impregnating the respective fiber reinforcement preform therein. In particular, each thermoplastic-forming material 20 comprises a first liquid polyisocyanate resin reactive stream 22 and a liquid, catalyzed, polyol resin reactive stream 24 that are admixed and immediately pump-injected in LCM fashion into each mold through a suitable orifice therein communicating with the molding cavity so as to impregnate and encapsulate the respective fiber reinforcement preform in the molding cavity. The compositions of the streams 20, 22 are selected to react substantially instantaneously in each mold tool in LCM fashion to couple the esterol with the polyisocyanate and thereby form an EB (electron beam) curable-thermoplastic material or matrix impregnating and encapsulating the fiber reinforcement preform therein.

The polyisocyanate resin stream 22 comprises an aromatic or aliphatic polyisocyanate, such as preferably polymeric toluene diisocyanate, of the type described in U.S. Pat. No. 4,374,229, the teachings of which are incorporated herein by reference. A preferred polyisocyanate for stream 22 is available as ARIMAX 1100-10 SIDE A from Ashland Chemical, Inc., P.O. Box 2219, Columbus, Ohio 43216, and is identified by that source as poly(methylene phenylene) polyisocyanate (diisocyanate).

The polyol stream 24 comprises an unsaturated esterol (unsaturated alcohol) and catalyst/amine promotor of the type described in aforementioned U.S. Pat. No. 4,374,229 for the polyol/isocyanate reaction. A preferred esterol for stream 24 is available as ARIMAX 1100 SIDE B from aforementioned Ashland Chemical, Inc. and is identified as an acrylic copolymer/ester in proportions, by weight, of 75-80%/20-25%. The esterol typically comprises a fumarate (e.g., see Example 1 of U.S. Pat. No. 4,514,229) having carbon-to-carbon double bonds and being self-cross linking by EB irradiation as described below. For example, the fumarate is formed by the catalytically induced addition reaction of a dicarboxylic acid anhydride (such as maleic anhydride or a mixture of maleic anhydride and phthalic anhydride) with a lower alkylene oxide in the presence of methacrylic acid or acrylic acid as the initiator followed by isomerization of the addition reaction products to the fumarate.

In accordance with the present invention, the polyisocyanate reactive stream 22 is formulated to be devoid of free-radial, thermoset-promoting catalysts (e.g., the VAZO 64 and benzoyl peroxide catalysts for stream #1 of Example IV of U.S. Pat. No. 4,374,229) so that, in the practice of the method of the present invention, the streams 22, 24 react to form the aforementioned thermoplastic matrix without thermosetting thereof by the reaction exotherm. In effect, a solely EB curable-thermoplastic, rigid matrix or material is formed and is not activated to thermoset unless bombarded with high energy electrons as will be described below. In this way, the first and second rigid, fiber reinforced, thermoplastic composite members are formed in the respective molds and, as a result of their thermoplasticity, are joinable together by localized, high speed thermoplastic fusion bonding (e.g. tack welding) techniques to be described hereinbelow.

In order to adjust the mechanical properties (e.g., the rigidity) of the thermoplastic matrix formed by reaction of streams 22, 24, the esterol may comprise a physical blend of two esterols wherein one esterol is made by reaction of propylene oxide, maleic anhydride and methoacrylic acid (e.g., per Example 1 of U.S. Pat. No. 4,374,229) and the other is made by a similar reaction of ethylene oxide, maleic anhydride and methacrylic acid. To this same end, the polyol stream 24 may include anhydrous silicates, such as CAB-O-SIL ® TR720, as hydrophobic fillers.

Following removal from the respective molds, the first and second rigid, fiber reinforced, thermoplastic composite members are trimmed to remove flash and other unwanted material. Attachments and inserts (such as electrical wiring harnesses, steel braces, foam padding, and bulkheads in the context of motor vehicle composite members) may be fastened to one or both of the fiber reinforced, thermoplastic composite members after the trimming operation as indicated in FIG. 1 (for the outer fiber reinforced, thermoplastic composite member). Attachment and insertion of such components is facilitated at this point in the manufacturing process since both sides of each fiber reinforced, thermoplastic composite member are readily accessible.

In accordance with a method embodiment of the present invention, an EB-curable liquid adhesive material is applied to one or both of the surfaces 12a, 14a before the composite members 12, 14 are assembled together. The surfaces 12a, 14a define the interface F therebetween when the composite members are assembled as shown in FIG. 2. The adhesive material is applied as a continuous bead or layer around the entire peripheral extent of the surface 12a and/or 14a. Typically, the adhesive material is applied on an inner region R1 of surface 12a and/or 14a, leaving an outer region R2 devoid of adhesive material. The adhesive can be applied manually or by conventional automated equipment. A suitable adhesive material comprises a solventless, liquid oligomer, such as a solvent-less acrylate, preferably a urethane acrylate or epoxy acrylate. The viscosity of the adhesive can be controlled for application on the surface 12a and/or 14a by adjusting molecular weight (e.g. the urethane group or epoxy group molecular weight) and/or the filler (CAB-O-SIL filler available from Cabot Corporation) content of the adhesive. An exemplary urethane acrylate adhesive is LOCTITE 398 available from Loctite Corporation. As purchased, this adhesive material contains a catalyst and UV absorbers, which need not be present in the adhesive material for use in the invention where the material will typically be out of range of UV light. Their elimination from the adhesive will reduce its cost and thus the cost of practicing the invention.

After adhesive application, the first and second rigid, fiber reinforced, thermoplastic composite members 12, 14 are assembled with surfaces 12a, 14a juxtaposed as shown in FIG. 2 with the adhesive material therebetween at inner surface regions R1. The composite members 12, 14 are fusion bonded together typically at spaced apart locations along the outer regions R2 of the surfaces 12a, 14a devoid of adhesive material to form a hollow structural section having cavity 15.

In particular, the first and second composite members typically are fixtured with their opposing peripheral regions (e.g., opposing molded flanges or shoulders defining surfaces 12a, 14a) juxtaposed to define the interface F therebetween, and then periodic ultrasonic tack welds are made along the outer regions R2 at the interface F while the adhesive material resides at the inner regions R1 and the innermost surfaces of the composite members are in spaced relation to form the desired internal cavity 15. As a result of their thermoplasticity, the first and second fiber reinforced, thermoplastic composite members preferably can be partially bonded at the interface F by fusing (melting) selected spaced apart opposing regions together (e.g., the aforementioned tack welded regions of the molded flanges or shoulders) using conventional localized, high speed thermoplastic tack welding techniques, such as ultrasonic, induction, resistance and other fusion welding techniques. Use of thermoplastic fusion tack welding techniques will greatly facilitate manufacture of hollow sections from the fiber reinforced, thermoplastic composite assemblies in a high volume production environment.

The opposing peripheral flanges or shoulders to be fusion tack welded may include tits or projections to induce a melted region therebetween during the bonding operation.

Following partial bonding, the hollow sections may be sent to a trimming station for further trimming of excess or unwanted material therefrom or for trimming to final dimensional tolerances. The tack welded regions R2 are present and hold the composite members 12, 14 together with adhesive material between the shoulders or flanges during the trimming operation and during radiation curing.

The hollow section is then subjected to a EB irradiation curing operation effective to cure the adhesive material and the tack welded first and second fiber reinforced, thermoplastic members to a thermoset condition useful in structural applications. In particular, the hollow section is exposed to high energy electron beam radiation to obtain the thermoset condition. EB curing of the adhesive material and the tack welded fiber reinforced, thermoplastic composite assemblies effects self cross-linking of the esterol chains through the carbon-to-carbon double bonds or linkages, thereby imparting a thermoset condition to the adhesive material and the tack welded composite assemblies. Curing occurs at the interface F through the liquid adhesive material and also through the solid fusion tack welds thereat.

Typically, the hollow section is carried on a conveyor or other moving device and passed at a suitable speed through an electron generating processor that generates high energy electrons, typically from a heated filament in a vacuum chamber for passage through a suitable window to the hollow section outside the window. The electron beam has sufficient intensity to effect curing to the thermoset condition. Since EB curing does not generate a high exotherm, no fixturing of the hollow section is required, although it may be used if desired.

Suitable electron generating processors for use in practicing the present invention are commercially available, such as from High Voltage Engineering Company, Burlington, Vt., General Electric Co. Milwaukee, Wis., and Radiation Dynamics, Inc., Westbury, Long Island, N.Y. Electron generating processors are described in the Brenner and Oliver technical article entitled "Commercial Aspects Of Instantaneous Radiation Cure Of Reinforced Plastics", 22nd Annual Conference, The Society of the Plastics Industry-Reinforced Plastics Division. The size and electron beam intensity required to cure to the thermoset condition will depend on the size, especially the wall thickness, of the bonded hollow section and its speed through the electron beam as well as the type of EB-curable adhesive material and EB curable-thermoplastic matrix formed and its curing properties.

The outer, partially fusion bonded regions R2 could, if desired, reside at outermost regions to be trimmed or otherwise removed from the final EB-cured, fully bonded assembly.

The invention is advantageous in that tack welding of the outer regions of the interface F is rapid, curing of the adhesive material at the inner regions of the interface F also is rapid, only a few seconds typically being required, and the EB-cured adhesive material provides an adhesive bond between the composite members 12, 14 that can accommodate irregularities, mismatch, and the like at the surfaces 12a, 14a of the interface F.

While the invention has been described in terms of specific embodiments thereof, it is not intended to be limited thereto but rather only to the extent set forth hereafter in the following claims.

The embodiments of the invention in which an exclusive property or privilege is claimed are defined as follows:

1. A method of making a hollow section fiber reinforced composite assembly, comprising the steps of:
   a) forming a first rigid, fiber reinforced, EB-curable thermoplastic composite member,
   b) forming a second rigid, fiber reinforced, EB-curable thermoplastic composite member,
   c) providing EB-curable adhesive material at an interface formed by assembling the composite members,
   d) fusion bonding the first and second fiber reinforced, thermoplastic members at spaced apart locations to form a hollow section, and
   e) subjecting the fusion bonded hollow section to irradiation by electrons effective to cure the adhesive material and the fusion bonded first and second fiber reinforced, EB-curable thermoplastic members to a thermoset condition.

2. The method of claim 1 wherein in step d), the composite members are fusion bonded at said spaced apart locations by periodically tack welding them together at the interface.

3. The method of claim 1 wherein the adhesive material is applied before the composite members are fusion bonded at said spaced apart locations.

4. The method of claim 1 wherein the adhesive material comprises a solvent-less acrylate.

5. The method of claim 4 wherein the solvent-less acrylate comprises one of urethane acrylate and epoxy acrylate.

6. The method of claim 1 wherein in step a) the first fiber reinforced, EB-curable thermoplastic member is formed by introducing a non-catalyzed, liquid polyisocyanate material and a catalyzed, liquid polyol material into a mold about a fiber reinforcement therein and reacting the materials to form an EB-curable thermoplastic matrix about the fiber reinforcement.

7. The method of claim 6 wherein the polyisocyanate material comprises a diisocyanate.

8. The method of claim 6 wherein the polyol material comprises an unsaturated esterol and a catalyst for the polyol/polyisocyanate reaction.

9. The method of claim 8 wherein the unsaturated esterol comprises a fumarate formed by the catalytically induced addition reaction of a dicarboxylic acid anhydride with alkylene oxide in the presence of methacrylic or acrylic acid followed by isomerization of the addition reaction product to the fumarate.

10. The method of claim 1 wherein in step b) the second fiber reinforced, EB-curable thermoplastic member is formed by introducing a non-catalyzed, liquid polyisocyanate material and a catalyzed, liquid polyol material into a mold about a fiber reinforcement therein and reacting the streams to form an EB-curable thermoplastic matrix about the fiber reinforcement.

11. The method of claim 10 wherein the polyisocyanate material comprises a diisocyanate.

12. The method of claim 10 wherein the polyol material comprises an unsaturated esterol and a catalyst for the polyol/polyisocyanate reaction.

13. The method of claim 12 wherein the unsaturated esterol comprises a fumarate formed by the catalytically induced addition reaction of a dicarboxylic acid anhydride with alkylene oxide in the presence of methacrylic or acrylic acid followed by isomerization of the addition reaction product to the fumarate.

14. The method of claim 1 wherein in step e), the partially bonded, adhesive-bearing hollow section is subjected to irradiation by an electron beam.

15. The method of claim 14 wherein said hollow section is passed through the electron beam.

16. A method of making a hollow section fiber reinforced structural composite assembly, comprising the steps of:
   a) forming a first rigid, fiber reinforced, EB-curable thermoplastic composite member by introducing a non-catalyzed, liquid polyisocyanate material and a catalyzed, liquid unsaturated esterol material into a mold about a fiber reinforcement therein and reacting the materials to form an EB curable-thermoplastic matrix about the fiber reinforcement,
   b) forming a second rigid, fiber reinforced, EB-curable thermoplastic composite member by introducing a non-catalyzed, liquid polyisocyanate material and a catalyzed, liquid unsaturated esterol material into a mold about a fiber reinforcement therein and reacting the materials to form an EB curable-thermoplastic matrix about the fiber reinforcement,
   c) providing solvent-less EB-curable adhesive material at an interface formed by assembling the composite members,
   d) fusion bonding the first and second fiber reinforced, thermoplastic members at spaced apart locations to form a hollow section, and
   e) irradiating the fusion bonded hollow section with electrons to cure the adhesive material and the fusion bonded first and second fiber reinforced, EB-curable thermoplastic members to a thermoset condition.

17. The method of claim 16 wherein the unsaturated esterol material comprises a fumarate formed by the catalytically induced reaction of a dicarboxylic acid anhydride with alkylene oxide in the presence of methacrylic or acrylic acid followed by isomerization of the addition reaction product to the fumarate.

18. The method of claim 16 wherein in step d), the composite members are fusion bonded at said spaced apart locations by periodically tack welding them together at the interface.

19. The method of claim 16 wherein the adhesive material is applied before the composite members are fusion bonded at said spaced apart locations.

20. The method of claim 16 wherein the adhesive material comprises a solvent-less acrylate.

21. The method of claim 20 wherein the solventless acrylate comprises one of urethane acrylate and epoxy acrylate.

22. A composite assembly comprising first and second EB-thermoset composite members defining a cavity therebetween and joined by an EB-cured adhesive bond and a plurality of fusion bonds at spaced apart locations therebetween.

23. The assembly of claim 22 wherein the composite members are each EB-cured from a thermoplastic to thermoset condition.

24. The assembly of claim 22 wherein the EB-cured adhesive bond is EB-cured from a thermoplastic to thermoset condition.

25. The assembly of claim 22 where the fusion bonds each comprise a tack weld.

26. The assembly of claim 22 wherein the adhesive bond is located proximate the periphery of said composite members and said fusion bonds are located at a region of said composite members devoid of said adhesive bond.

* * * * *